###

United States Patent [19]
Mazurek

[11] 3,758,170
[45] Sept. 11, 1973

[54] SNOWMOBILE TRACK
[75] Inventor: Edward A. Mazurek, Thief River Fall, Minn.
[73] Assignee: Arctic Enterprises, Inc., Thief River Falls, Minn.
[22] Filed: Dec. 27, 1971
[21] Appl. No.: 212,033

[52] U.S. Cl. .......................................... 305/35 EB
[51] Int. Cl. ..................... B62d 55/24, B62m 27/02
[58] Field of Search ..................... 305/35 EB, 38, 54

[56] References Cited
UNITED STATES PATENTS
3,165,364   1/1965   Hardman ...................... 305/35 EB
3,485,312   12/1969   Swenson .......................... 180/5 R
2,367,751   1/1945   Bombardier .................... 305/35 EB FOREIGN PATENTS OR APPLICATIONS
446,088   3/1968   Switzerland .................... 305/35 EB Primary Examiner—Richard J. Johnson
Attorney—Everett J. Schroeder et al.

[57] ABSTRACT

A track assembly for a snowmobile is provided wherein an endless flexible belt has joined thereto a plurality of cleat assembly members extending transversely across the belt, said cleat assembly includes at least two cleat members having a flange portion extending outwardly from the belt with each of said cleat members being joined to opposite ends of a spring steel member to form a unitary cleat assembly.

10 Claims, 5 Drawing Figures

PATENTED SEP 1 1 1973          3,758,170

INVENTOR
EDWARD MAZUREK
BY Schroeder, Siegfried,
Ryan & Vidas
ATTORNEYS

SNOWMOBILE TRACK

The present invention is directed to tracks for vehicles and is particularly directed to an improved track assembly for a snowmobile. Snowmobiles generally have a track construction wherein an endless belt member provides both a support for the rear of the vehicle as well as providing a means for transmitting power to move the snowmobile. Such track systems generally incorporate endless belt members which, when maximum transmission of power is desired, have cleat members extending transversely across substantially the entire width of the belt to aid in gripping the underlying surface to aid in impelling the snowmobile in a forward direction. The cleat members generally are formed of steel and have a flange extending in a generally perpendicular direction from the surface of the belt to aid in the gripping action. Due to the nature of stresses experienced during operation of the snowmobile flexing movements are imparted to portions of the cleat members. This flexing after a prolonged period of operation brings about fatigue of the metal at the zone of flexing and ultimately results in breakage of the cleat.

In accordance with my invention a cleat assembly is provided wherein at least two cleat members having flange portions extending in a generally perpendicular direction to the surface of the belt are joined to the belt and are also joined to one another by an intervening member of a flat construction. In the preferred form of my invention the flat joining member is a spring steel. The two flanged cleat members are spaced so that the region where flexing tends to occur is intermediate the cleats and in this region the flat steel spring provides a joining means to give a unitary cleat assembly construction for each individual cleat assembly and yet is of a nature to be able to withstand repeated flexing without breakage. Due to the use of the multi-membered construction cleat breakage is substantially reduced.

In the preferred form of my invention the track is constructed of three parallel belt members with the outer belt members being joined to the central belt member by the flanged cleat portion and formed into a unitary cleat assembly by an intervening strip of spring steel.

IN THE DRAWINGS

Figure 4:
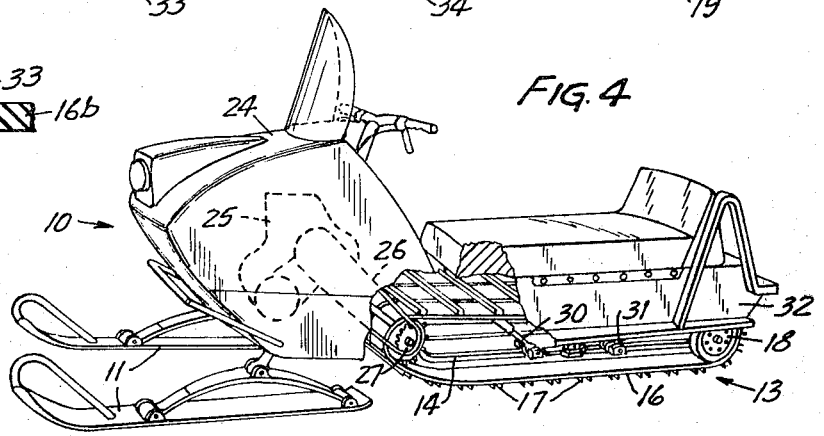
FIG. 4 is a perspective view of the snowmobile showing a portion of the body housing broken away to expose the track assembly.
Figure 5:
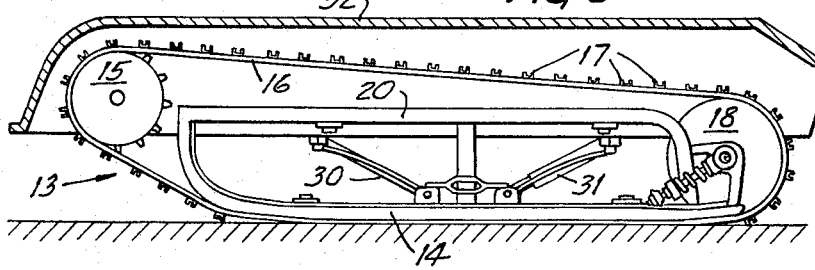
FIG. 5 is a side elevational view of the track assembly of FIG. 1 with the body portion in section.

Turning first to FIGS. 4 and 5 there is illustrated a snowmobile of a type commonly in use. In all of the figures like parts will be given the same numerical designation. As illustrated in FIG. 4 a snowmobile generally designated 10 is supported by a pair of steerable ski members 11 at the forward portion thereof and by endless track assembly generally designated 13 at the rear portion thereof. Shown in phantom beneath the hood 24 is a motor 25 and a chain drive assembly 26 which provides the motive power for track assembly 13. Track assembly 13 includes a belt 16 which is shown passing about a slide-rail suspension system that includes a runner or rail 14 which forms the lower edge of a slide-rail frame 20. Idler wheel 18 is mounted on a shaft mounted in frame 20. Pivotal spring biased arms 30 and 31 support body 32 above the track assembly 13. This general type of a track suspension is disclosed and claimed in the U.S. Patent to Swenson et al. U.S. Pat. No. 3,485,312 which is assigned to the same assignee as the present invention. Slide rail 14 is positioned between sections of belts 16 so as to ride on cleat assembly members 17 joining the separate portions of the track as will be explained further hereinbelow. Motive power for the track is provided by means of a drive wheel 15 which has cog members which extend through the openings 12 between the separate belt members and engage cleat assembly 17. Power for the driving mechanism is provided by means of a chain 26 which is in engagement with a chain sprocket 27.

Figure 1:
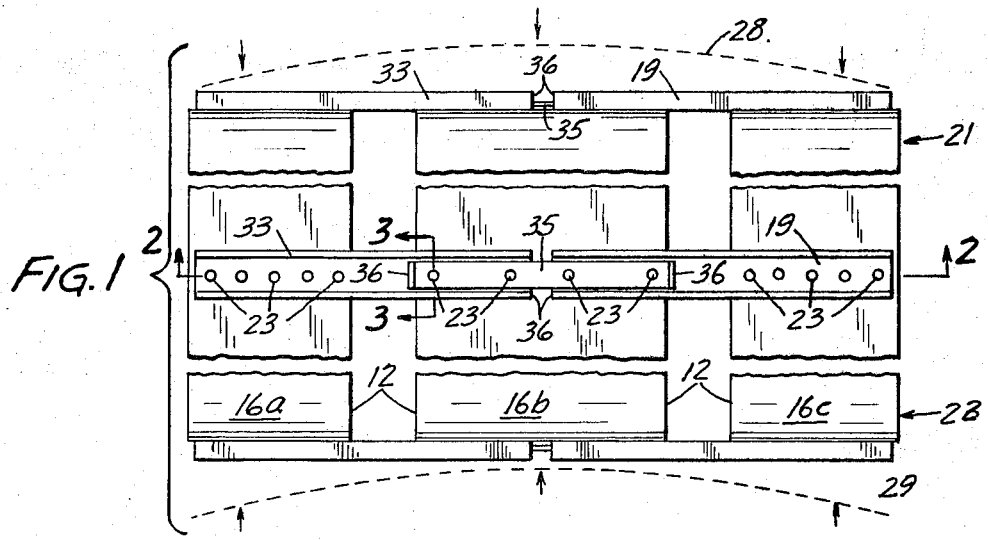
FIG. 1 is a top fragmentary plan view of a portion of a tread assembly in accordance with the invention and also illustrates certain forces occurring during operation.
Figure 2:
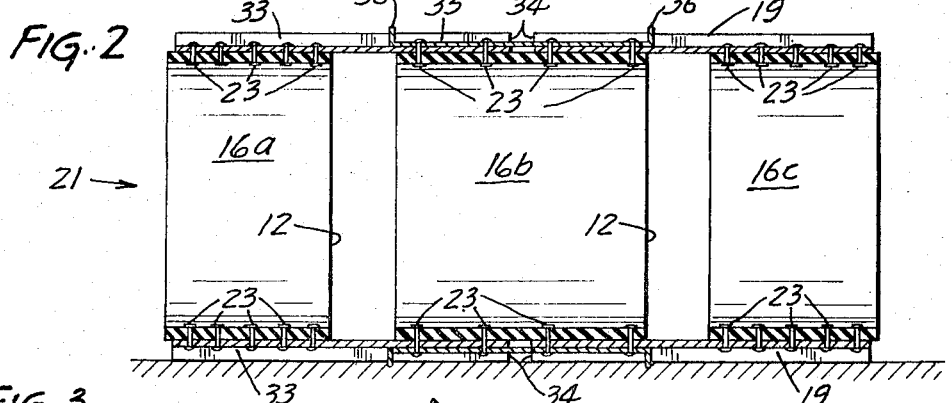
FIG. 2 is a cross-sectional view along lines 2—2 of FIG. 1.
Figure 3:
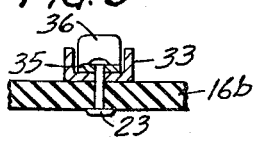
FIG. 3 is a sectional view of a portion of the cleat and belt of FIG. 1 along lines 3—3.

Referring now to FIGS. 1, 2 and 3 there is illustrated the preferred form of my invention wherein endless belt 16 is formed of three individual belts 16a, 16b and 16c arranged parallel to one another with intervening spaces 12 separating the outer belts from the inner belt. It is in these intervening spaces 12 that the slide rail 14 is positioned so as to be in sliding contact with the cleat members in the slide-rail suspension system of the Swenson et al. patent referred to above.

In FIG. 1 there is illustrated a top plan view of a tread and cleat assembly in accordance with my invention wherein I have shown a front portion generally designated 21 and a rear portion designated 22 of a tread assembly in accordance with the invention. For the sake of clarity in the illustration I have shown only one intermediate section of cleat assembly and its belt section. Additional cleat and belt sections are substantially identical to that shown in the drawing.

During operation of the snowmobile the track assembly encounters a variety of forces acting upon it in addition to the driving force provided by the cogged drive wheel 15. These forces include those arising from impact of the tread assembly with hard underlying objects such as rocks and furrows of plowed fields. In addition, as the track traverses the drive sprocket tension in the track tends to bend the cleat outwardly at the forward end (dotted line 28) and in the opposite direction (dotted line 29) as the track passes around idler wheel 18. As can be seen due to the nature of the power imparted to the tread assembly and the forces acting thereon there is a tendency for a curvature of a unitary cleat member in one direction at the forward portion of the tread assembly and in the opposite direction at the rear of the tread assembly. This bowing action creates continual flexure of the cleat members and ultimately results in fatigue and failure. Generally this failure tends to take place near the central portion of the overall cleat and is at least in part due to the nature and configuration of the materials that must be utilized for the cleats. The cleat must have considerable strength and hardness in order to meet its particular function of conveying the driving force for the snowmobile to the ground and because of the nature of its engagement with abrasive objects. In order to provide the maximum gripping action it is necessary that the cleat members have flanges projecting vertically from the belt so as to engage the underlying surfaces. These flanges are prone to fatigue cracks and these cracks are subsequently conveyed throughout the entire cross-section of the cleat. In accordance with my invention I provide a multiple number of cleats for each cleat assembly and join the cleats together into one cleat assembly by means of a flat bar member which due to the absence of projecting flanges is less prone to breakage than the cleats. That is, it will withstand flexing better than the flanged cleat. In the preferred form I use a relatively flexible spring steel member across the spaces between the flanged cleat portion. The spring steel member is without a projecting flange which inhibits the tendency to crack and also due to the nature of spring steel it can withstand repeated flexing without breakage.

A cleat assembly in accordance with my invention consists of a right cleat member 19 which is joined by means such as rivets 23 to belt member 16c and also to 16b. A left cleat member 33 is on line with cleat 19 and is joined to outer belt 16a and inner 16b by means of rivets 23. In FIGS. 1, 2 and 3 the cleat members 19 and 33 are both illustrated as being a U-shaped channel iron with the flange portions extending vertically upwardly from belts 16. Of course, simple angle irons can also be used. Generally the flange portions will extend vertically from the surface of the belt although it will be understood that the invention is equally applicable when the flanges are at angles other than vertical.

An intervening space 34 is left between cleats 19 and 33 so that the flanged portions of the cleats do not contact under conditions of use. Bridging gap 34 is a spring steel bar 35 which is joined at its outer ends to the internal ends of bars 19 and 33 respectively by means of rivets 23. Bar 35 being both flat in cross-section in the direction of flexure and being formed of a spring steel is capable of undergoing the multiple flexing required in operation without breaking. It likewise performs the function of tying bars 19 and 33 together so as to form one continuous cleat assembly and thus provide for action of the individual belts 16a, 16b and 16c as one unit. By joining the individual cleats 19 and 33 by means of bar 35 the stress at the rivets at the center belt is diminished and there is less tendency for these rivets to tear out from belt 16b.

An additional feature made possible by incorporation of bar 35 as a joining member for cleats 19 and 33 is that of providing a means to prevent side slipping of the track assembly when the snowmobile is passing over icy surfaces. In a cleat assembly having the flange perpendicular to the direction of motion there is essentially little that will prevent sidewards slippage of the snowmobile either during turns or when on sloped surfaces. Referring to FIGS. 1, 2 and 3 there is seen that the end portions of bar 35 have been turned upwardly to provide a flange 36 at each end thereof and intermediate the flanged edges of bars 19 and 33. These flanged portions 36 project vertically upwardly beyond the edges of the flanges of cleats 19 and 33 and thus engage the surface underlying tread assembly and tend to prevent sideward motion of the snowmobile under conditions of turn and the like.

It should now be apparent that a wide variety of variations can be made and still incorporate the principals of my invention. For example, one may sub-divide the cleat assembly into more than two flanged cleat members and have the intervening spaces between these cleat members spanned by a flexible member corresponding to spring member 35. Likewise, while the invention has been shown with particularity in combination with a snowmobile tread assembly utilizing three separate belts other belt arrangements can be used.

I claim:
1. A tread assembly for a snowmobile comprising:
   a. an endless belt assembly defining a tread;
   b. a plurality of cleat assembly members joined to and spaced along said belt and extending transversely across said belt assembly, said cleat assembly including at least two spaced cleat members each having a flat portion parallel to said belt surface with a flange extending outwardly from said belt, the flat portion of each of said cleat members being joined to opposite ends of a flat bar member to form a cleat assembly, the end portions of said bar member being turned upwardly to form a flange which projects beyond the edges of the flanged portions of said cleat members.

2. A tread assembly in accordance with claim 1 wherein the flat bar member is spring steel.

3. A tread assembly in accordance with claim 1 wherein said cleat members are channel shaped.

4. A tread assembly in accordance with claim 3 wherein said flat bar member is spring steel.

5. A tread assembly for a snowmobile comprising:
   a. An endless belt assembly defining a tread and including three endless belt members arranged in parallel configuration and spaced from one another;
   b. a plurality of cleat assembly members joined to and spaced along said belt and extending transversely across said belt assembly, said cleat assembly including at least two spaced cleat members each having a flat portion parallel to said belt surface with a flange extending outwardly from said belt, the flat portion of each of said cleat members being joined to opposite ends of a flat bar member to form a cleat assembly, the end portions of said bar member being turned upwardly to form a flange which projects beyond the edges of the flanged portions of said cleat members.

6. A tread assembly in accordance with claim 5, wherein said cleat members are channel shaped.

7. A tread assembly in accordance with claim 6, wherein said flat bar member is spring steel.

8. A tread assembly for a snowmobile comprising:
   a. An endless belt assembly defining a tread, and including a central and at least two side endless belt members arranged in parallel configuration and spaced from one another;
   b. a plurality of cleat assembly members joined to and spaced along said belt and extending transversely across said belt assembly, said cleat assembly including at least two spaced cleat members each having a flat portion parallel to said belt surface with a flange extending outwardly from said belt, the flat portion of each of said cleat members being joined to opposite ends of a flat bar member at a location intermediate the central belt member to form a cleat assembly.

9. A tread assembly in accordance with claim 8 wherein said cleat members are channel shaped.

10. A tread assembly in accordance with claim 9 wherein said flat bar member is spring steel.

* * * * *